Feb. 10, 1942.   C. G. STONE ET AL   2,272,781
MEANS FOR INDICATING THE DEGREE OF PRESSURE IN PNEUMATIC TIRES
Filed Jan. 16, 1940   3 Sheets-Sheet 1
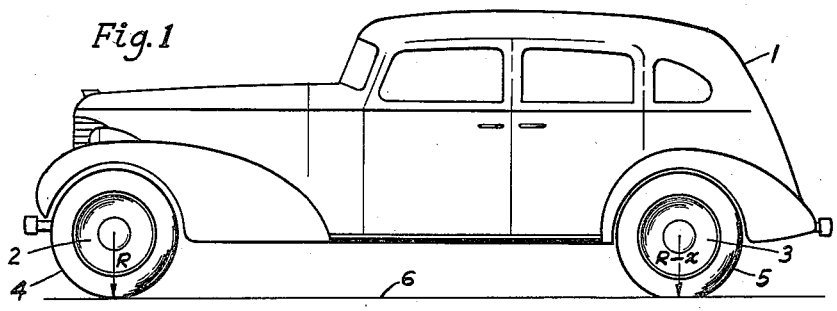
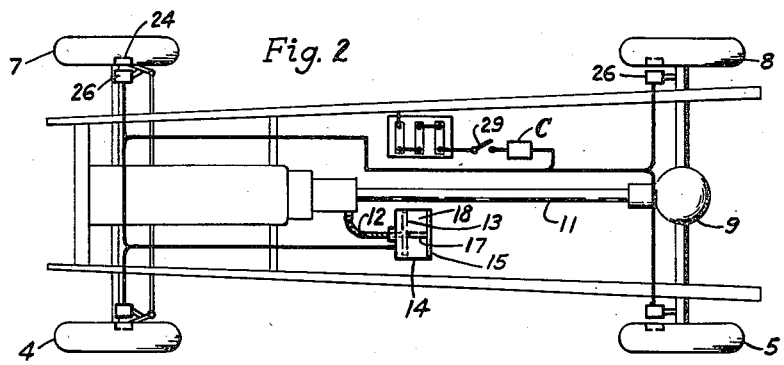
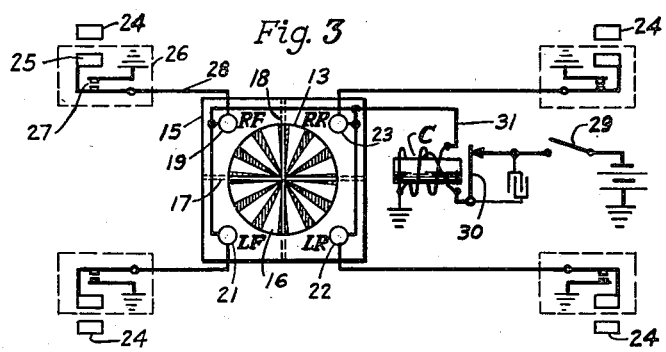
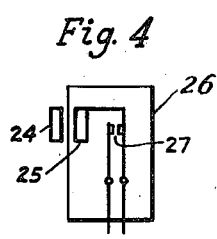
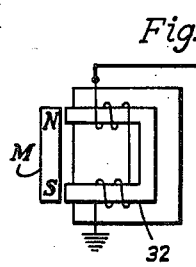
INVENTORS
CLARENCE G. STONE
BY HENRY F. HERBIG
Raymond M. Hicks
ATTORNEY Feb. 10, 1942. C. G. STONE ET AL 2,272,781
MEANS FOR INDICATING THE DEGREE OF PRESSURE IN PNEUMATIC TIRES
Filed Jan. 16, 1940  3 Sheets-Sheet 2

INVENTORS
CLARENCE G. STONE
HENRY F. HERBIG
BY Raymond M. Hicks
ATTORNEY

Feb. 10, 1942.    C. G. STONE ET AL    2,272,781
MEANS FOR INDICATING THE DEGREE OF PRESSURE IN PNEUMATIC TIRES
Filed Jan. 16, 1940    3 Sheets-Sheet 3

INVENTORS
CLARENCE G. STONE
BY HENRY F. HERBIG
ATTORNEY

Patented Feb. 10, 1942

2,272,781

UNITED STATES PATENT OFFICE 2,272,781

MEANS FOR INDICATING THE DEGREE OF PRESSURE IN PNEUMATIC TIRES

Clarence G. Stone, Mount Vernon, N. Y., and Henry F. Herbig, Galion, Ohio

Application January 16, 1940, Serial No. 314,186

11 Claims. (Cl. 116—34)

This invention relates to a system for indicating or registering the degree of pressure in pneumatic tires, and more particularly to a system for indicating a change in the pneumatic pressure of one or more tires of a vehicle such, for example, as an automobile, bus, truck or the like, while the vehicle is in motion.

As is well known, the amount of mileage obtained from a pneumatic tire varies with the degree of inflation of the tire and, in some instances, the mileage is reduced as much as 50 per cent by a decrease of 30 per cent in the recommended air pressure for the tire. Obviously, large sums of money are wasted annually by the operators of trucks, automobiles and buses by causing the same to be operated along the highways with the tires thereof in an underinflated condition. It is also well recognized that an underinflated pneumatic tire is more susceptible to punctures, cuts and bruises than a tire operating at the air pressure recommended by the manufacturer. In the case of large buses, for example, or large trucks operating over long distances on the highways it is sometimes necessary, when the loss of pressure in one of the tires occurs, to communicate with a repair station, usually situated near or within a large city, having the facilities for jacking up the disabled vehicle and effecting a change in the tires. This procedure may result in a delay in the delivery of the merchandise and is injurious to the reputation of the trucking company for quick service, a delay in the use of the truck and the services of the driver thereof and, in some cases, the deflated tire results in an accident involving property damage and loss of life or injury and not infrequently ruins the tire and tube.

In systems of this general character heretofore proposed the indicating device for registering the pressure of the pneumatic tires is controlled directly by the pressure within the tires or by the tilting of the axle of the vehicle when one of the tires affixed thereto is in a deflated condition. Such systems possess the disadvantages resulting from difficulty in maintaining a suitable air connection between the revolving tires and the indicating device or from the unavoidable tilting action of the axles due to the character of the road surface such, for example, as when the vehicle passes over roads having a high crown in the center or uneven surface.

In the present system, the foregoing disadvantages are obviated and the system is adapted to perform satisfactorily all of the functions of the systems heretofore proposed, and in which the circuits and mechanism employed are relatively simple with a minimum number of parts and connections and in which the cost of installation and maintenance is comparatively low and the possibility of system failure is reduced to a minimum.

One of the objects of the present invention is the provision of means for indicating the degree of pressure in the pneumatic tires of a vehicle while the vehicle is in motion.

Another of the objects is a tire indicating device controlled by the relative speeds of the tires of the vehicle in motion.

A further object resides in the provision of the automatic correction for the difference in the speeds of the tires when the vehicle is passing around a curve.

A still further object of the invention resides in the provision of means operable at will for compensating for the difference of the speed of the wheels due to the wear of the tires while the vehicle is in motion.

Still other objects, advantages and improvements will be apparent from the following description of several illustrative embodiments of the invention disclosed in the accompanying drawings, in which like numerals of reference are employed to denote corresponding parts throughout the several views and, in which:

Fig. 1 is a view illustrating one embodiment of the invention,

Fig. 2 is a plan view of the device of Fig. 1,

Figure 6:
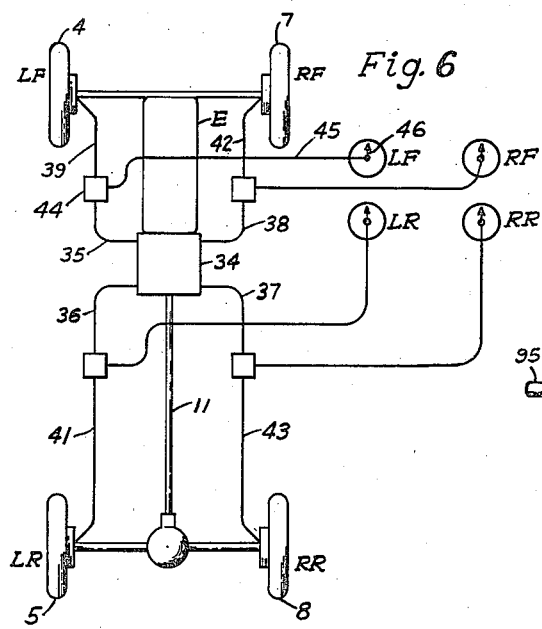
Figure 9:
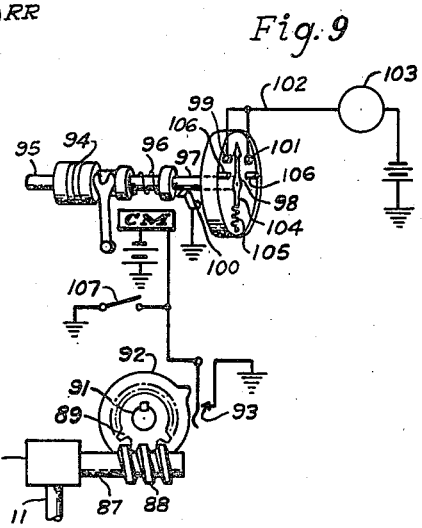
Figure 7:
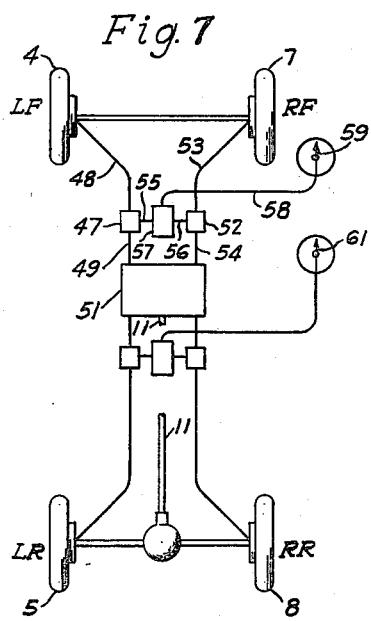
Figure 8:
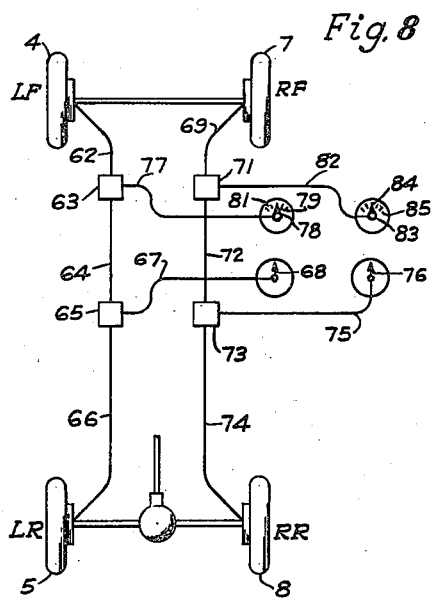
Figure 10:
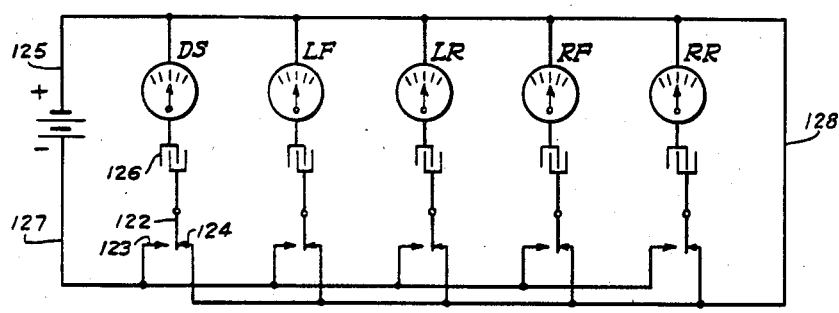
Figure 11:
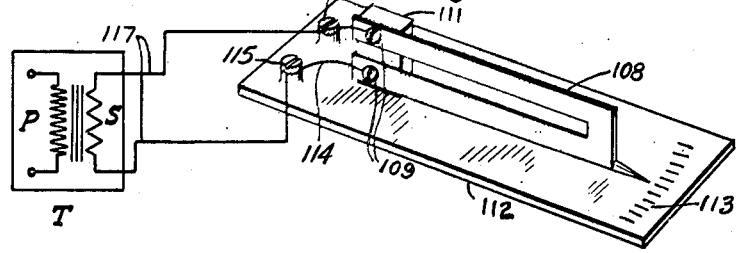
Figure 12:
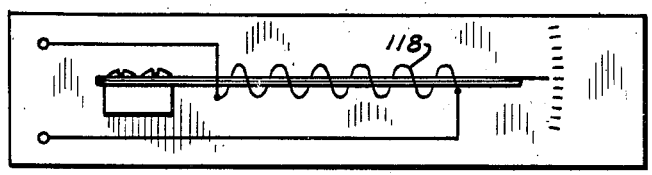
Figure 13:
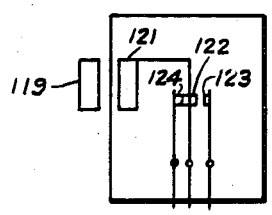

Fig. 3 is a diagrammatic view of the circuit arrangement employed with the device of Figs. 1 and 2, Fig. 4 is a view, somewhat enlarged, of the impulse device of Fig. 3, Fig. 5 illustrates another form of impulse generating means, Fig. 6 illustrates another arrangement of parts of the invention, Fig. 7 shows a modification of the arrangement of Fig. 6, Fig. 8 is a modification of the arrangement of Fig. 7, Fig. 9 shows in diagrammatic form an alarm system suitable for use with the arrangements of Figs. 6, 7 and 8, Fig. 10 is a novel circuit arrangement for use with the present invention, Fig. 11 is a view of a form of indicating device suitable for use with the circuit arrangement of Fig. 10, Fig. 12 shows a modified form of the indicating device of Fig. 11 and, Fig. 13 shows one form of device suitable for generating the electrical impulses for the circuit arrangement of Fig. 10.

Referring first to Fig. 1 of the drawings, there is shown thereon a conventional form of vehicle 1 equipped with wheels 2 and 3 having pneumatic tires 4 and 5 mounted thereon for engagement with the roadbed 6 along which the vehicle is traveling. The tire 4 is fully inflated to the degree of pressure recommended by the manufacturer whereas the pressure of the tire 5 is somewhat less than the recommended degree of pressure, thereby producing an appreciable flattening of the tire 5 at that portion of the periphery thereof in contact with the roadbed 6. The effective radius of the tire 4 is indicated by the letter $R$ and the effective circumference thereof is indicated by the expression $2\pi R$. The flattening of the tire 5 resulting from the decreased pressure within the tire causes the wheel 3 to be nearer to the roadbed 6 by the amount $x$. The effective radius of the tire 5 is given by the expression $R-x$ and the effective circumference of the tire 5 is therefore $2\pi(R-x)$ or less than the circumference of the tire 4 by the amount $2\pi x$. This decrease in the effective circumference of the tire 5 causes the wheel 3 to rotate at a relatively higher rate of speed than the wheel 2 as the vehicle moves along the roadbed, the difference in the relative angular speeds of the wheels 2 and 3 being proportional to the difference in the degree of pneumatic pressures of the tires 4 and 5. The manner in which the difference in the speed of rotation of one or more of the wheels of the vehicle is employed while the vehicle is in motion to cause an indication to be given of the pressures within the tires of the vehicle will be more clearly apparent as the description proceeds.

Fig. 2 of the drawings shows in more or less diagrammatic form a plan view of the vehicle of Fig. 1, only as much of the vehicle being shown as is necessary for a complete understanding of one of the aspects of the present invention. In this embodiment of the invention the vehicle is supported by the tires 4, 5, 7, and 8 of which the tires 4 and 7 are mounted on the front wheels and the tires 5 and 8 on the rear wheels of the vehicle. The rear wheels 5 and 8 are connected through the differential 9 to the main drive shaft 11 having geared thereto the shaft 12 to which is affixed the stroboscopic disc 13 suitably mounted for rotation within the casing 14. The stroboscopic disc is divided into sections having distinguishing characteristics, as, for example, the dark and light areas shown on Fig. 3.

The casing 14 is provided with a mask 15 having an aperture 16 therein through which the disc is exposed to view. Intermediate the disc and the mask, the light baffle plates 17 and 18 are disposed in such a manner that the disc is divided into quadrants substantially as illustrated on Fig. 3. Disposed within the casing 14 are the glow discharge lamps 19, 21, 22, and 23, which may be filled, for example, with neon gas or the like, in such a manner as to illuminate that portion of the disc subtended by the baffle plates 17 and 18 with which each of the lamps is associated.

Each of the wheels 4, 5, 7, and 8 is provided with a permanent magnet 24, Figs. 2, 3 and 4, which attracts the armature 25 of the switch mechanism 26 sufficiently to close the contacts 27 as the magnet 24 is brought into adjacent relationship with the armature 25 by the rotation of the associated wheel of the vehicle. The closure of contacts 27 of the switch mechanism 26 applies ground to conductor 28 extending to one terminal of the neon lamp 19, Fig. 3.

The closure of the switch 29, Fig. 3, applies battery by way of break contact and armature 30 of the induction coil C from whence the circuit is continued through the primary winding of the coil C to ground thereby causing the armature 30 to vibrate and set up a high voltage in the secondary winding of the coil, which is communicated by way of conductor 31 to one terminal of each of the neon tubes 19, 21, 22, and 23. The rotation of the wheel associated with the switch mechanism 26 causes the contacts 27 thereof to be brought momentarily into engagement with each other in the manner stated and thus cause the lamp 19 to flash and illuminate the portion RF of the stroboscopic disc subtended by the baffle plates 17 and 18.

From the foregoing description it is clearly apparent that if a single magnet 24 is provided for the wheel 7, the contacts 27 will apply ground to the conductor 28 and cause the lamp 19 to flash once for each revolution of the wheel 7. The number of divisions on the disc 13 bears a relation to the gear ratio between the shafts 11 and 12 such that the portion of the stroboscopic disc 13 appearing within the quadrant RF will appear unchanged when the front and rear wheels of the vehicle are rotated at the same angular speed. In a similar manner the quadrants LF, LR, and RR are illuminated by lamps 21, 22, and 23, respectively, such that the quadrants LF, LR, and RR of the disc 13 appear to be stationary when all wheels of the vehicle are rotating at the same velocity regardless of the speed at which the vehicle is traveling.

If it be assumed, by way of example, that the pressure in the tire 7 is less than the pressures in the tires 4, 5 and 8, the wheel associated with tire 7 will rotate at a relatively higher speed than the remaining wheels of the vehicle and the lamp 19 will therefore flash at a higher rate than the lamps 21, 22 and 23 thereby giving the appearance of rotation to that portion of the disc 13 appearing within the quadrant RF in a direction opposite to the direction of rotation of the disc. A signal is thus given of an indication that the pressure in the right front tire has decreased from the degree of pressure of the remaining tires of the vehicle.

If, on the other hand, the pressure in the tire 7 should be excessive, the speed of rotation of this tire would be less than that of the other tires and the RF quadrant of the stroboscopic disc would appear to be moving in the direction of rotation of the disc. It will be obvious that, if desired, several magnets 24 may be employed with each of the wheels of the vehicle by merely providing a suitable number of markings on the stroboscopic disc and a corresponding ratio of gearing between the shafts 11 and 12.

Briefly stated, the arrangement of Fig. 3 provides a system for indicating the condition of pressure in each of the tires of the vehicle by means of a device which may be located within view of the operator of the vehicle and which depends for the principle of operation upon the relative speeds of the wheels of the vehicle while the vehicle is in motion.

Fig. 5 of the drawings discloses an arrangement of circuits and parts suitable for the operation of the glow discharge lamps of Fig. 3 wherein the switch mechanism 26 of Fig. 4 is not required. In this arrangement, an electromagnet of the bipolar type designated 32 is connected in series with a relay R, both ends of this circuit being connected together to ground. The permanent magnet M is mounted on a wheel of the vehicle such that the north and south poles of the magnet sweep past the ends of the core of the electromagnet 32 as the wheel rotates and sets up a current in the winding of the electromagnet which passes through the winding of relay R thereby causing relay R to operate momentarily. The operation of relay R closes a circuit from battery at armature 33 thereof to the winding of the induction coil C thereby causing the induction coil C to operate and flash the glow discharge lamp L.

Referring now to Fig. 6 of the drawings on which is shown in more or less conventional form an automobile having pneumatic tires 4, 5, 7 and 8, an engine E and a gear box 34 which may be included within the transmission housing of the automobile or separate therefrom, provided with a set of gears for connecting the shafts 35, 36, 37 and 38 to the drive shaft 11 of the vehicle in such a manner that the shafts 35, 36, 37 and 38 are each driven by the drive shaft 11 and rotate at the same speed when each of the tires is inflated to the same degree of pressure. There are also provided the shafts 39, 41, 42, and 43 connected by suitable gears to the wheels upon which tires 4, 5, 7 and 8, respectively, are mounted, the gearing arrangement being such that, when all wheels rotate at the same speed, the shafts 35, 36, 37 and 38 rotate at the same speed as the shafts 39, 41, 42 and 43 but in the opposite direction to the rotation of shafts 39, 41, 42 and 43. The shafts 35 and 39 terminate in a differential gear box 44 having the shaft 45 extending therefrom to which is attached the indicator 46.

When the shafts 35 and 39 rotate at the same speed in opposite directions the shaft 45 does not rotate and the pointer 46 remains in a stationary position, thereby indicating that the pressure within tire 4 is the same as the tires 5 and 8 of the vehicle. If, for any reason, the pressure in the tire 4 should be reduced, the tire 4 will rotate faster than the tires 5 and 8 and the associated shaft 39 will rotate faster than the shaft 35 thereby causing the pointer 46 to rotate as an indication of this condition. In a similar manner, the loss of pressure in the tires 7, 5, or 8 will be indicated on the indicators RF, LR and RR, respectively. The speed of rotation of the indicators of Fig. 6 increases in accordance with the degree of deflation of one or more tires with respect to the remaining tires. If the pressure within the tire 4, for example, should be too high, the associated indicator would rotate slowly in the opposite direction as the vehicle moved along the roadbed as an indication of this condition.

Fig. 7 shows a system for indicating a change in the tire pressure of any tire or a simultaneous change in the degree of inflation of both front or both rear tires. The operation of the system of Fig. 7 will be described with reference to the front tires of the vehicle only, for the reason that the operation of the indicator for the rear tires functions in a similar manner. The differential 47 is provided with a shaft 48 connected to the left front wheel LF and a shaft 49 thereof connected by way of the gear box 51 to the drive shaft 11 similar, in this respect, to the arrangement of Fig. 6. The differential 52 has the shafts 53 and 54 thereof in operative engagement with the right front wheel RF and drive shaft 11, respectively, in this respect similar to the arrangement of Fig. 6. The shafts 55 and 56 of the differentials 47 and 52, respectively, do not rotate when all tires of the vehicle are inflated to a uniform degree of pressure. Shafts 55 and 56 are connected to the differential 57 in such a manner that the movement of shafts 55 and 56 with respect to each other will cause movement of the shaft 58 and the indicator 59. When the vehicle is rounding a curve to the right, shaft 48 is rotating at a faster speed than shaft 49 and shaft 49 is rotating faster than shaft 53. Since the shafts 49 and 54 are operated by the drive shaft 11, they are rotating at approximately the mean speeds of the shafts 48 and 53 and shafts 55 and 56 will each rotate at approximately the same rate of speed while the car is rounding the curve as stated with the result that the indicator 59 remains in a substantially stationary position under this condition. It will be readily appreciated from the foregoing description that the indicator 59 will likewise not rotate appreciably while the vehicle is turning to the left.

When the pressure in the tire 4 is relatively low, shaft 48 rotates at a higher rate of speed than shaft 49, the shaft 53 rotating, for example, at the same speed as shaft 54. The shaft 56, under this condition, does not move but, due to the difference in speeds of the shafts 48 and 49, the shaft 55 rotates and causes movement of the shaft 58 and pointer 59 in a direction to indicate that the pressure in the tire 4 is low. Similarly, low pressure in the tire 7 causes movement of the shaft 56 and if it be assumed that the pressure in tire 4 is normal at this time, shaft 55 does not move, thereby causing movement of the pointer 59 in the opposite direction to indicate a decrease of pressure within the tire 7. The indicator 61 is employed to register the condition of pressure within the rear tires 5 and 8 of the vehicle in a similar manner.

In addition to providing a system for automatically correcting for the difference in speeds of the tires of a vehicle when the vehicle is rounding a curve, the system of Fig. 8 provides an arrangement for correcting for the difference of the angular speeds of the individual wheels of the vehicle due to the wear of tires and includes a set of indicators for registering the relative pressure in each of the tires. Operatively connected to the wheel LF is the shaft 62 which terminates in a speed control mechanism 63 having a shaft 64 extending therefrom to the differential 65. The left rear wheel LR is connected by means of the shaft 66 to the opposite side of the differential 65. The differential 65 is connected by way of the shaft 67 to the indicator 68. In a similar manner, the wheel RF is connected by means of the shaft 69 to the speed control mechanism 71 having the shaft 72 extending therefrom to the differential 73 which is connected to the right rear wheel RR by the shaft 74. The differential 73 is provided with a shaft 75 extending to the pointer 76. The speed control mechanism 63 is provided with a control shaft 77 extending to a knob 78 having a pointer 79 connected thereto which coacts with the scale 81 to enable the pointer to be set in any desired position and thus adjust the speed control mechanism 63 whereby a particular speed ratio between the shafts 62 and 64 may be obtained. In a similar manner, the control mechanism 71 is connected by means of the control shaft 82 to the knob 83 having attached thereto a pointer 84 movable to different positions about the scale 85 representative of the gear ratio established between the shafts 69 and 72 by the speed control mechanism 71.

When the effective diameters of each of the tires of the vehicle are the same, as for example, when all the tires are new and inflated to the same degree of pressure, the speed control mechanisms 63 and 71 are set by the knobs 78 and 83, respectively, to the positions wherein shafts 62 and 64 rotate at the same speed and shafts 69 and 72 rotate at the same speed. The control knob 78 is settable in accordance with the difference in the effective diameters of the left front and left rear tires due to wear of the tires and the knob 83 is settable to positions in accordance with the difference in the effective diameters of the right front and right rear tires resulting from wear.

If, for example, the right rear tire should rotate faster than the right front tire due to wear of the right rear tire, the knob 83 would be moved to the appropriate position thereby changing the speed ratio between the shafts 69 and 72, whereby the pointer 76 remains in a substantially stationary position with the same degree of inflation in the right front and right rear tires while the vehicle is in motion. In a similar manner, the knob 78 is adjusted to compensate for the difference in the effective diameters of the left front and left rear tires due to the effects of wear.

The system of Fig. 8 causes the indicators 68 and 76 to remain in substantially stationary positions while the vehicle is rounding curves for the reason that the left front and left rear tires are rotating at substantially the same speed while rounding curves and the shaft 67, therefore, does not rotate appreciably. Also, the right front and right rear tires maintain substantially the same speed relationship with respect to each other while rounding curves with the result that the pointer 76 does not move appreciably during this time.

If the left front tire 4 becomes partially deflated, the resultant increase of the speed of the shaft 64 relative to the shaft 66 causes the pointer 68 to rotate in a direction indicative of this condition. If the left rear tire 5 through under-inflation rotates faster than the left front tire 4, the shaft 66 rotates relatively faster than the shaft 64 causing the pointer 68 to rotate in the opposite direction as an indication of this condition. In a similar manner, the pointer 76 rotates in either a clockwise or counter-clockwise direction in accordance with the difference in pressures of the right front and right rear tires 7 and 8 respectively.

In the event that it is desired to give a visual or audible alarm in connection with the systems of Figs. 6, 7 and 8, the system of Fig. 9 may be employed. Briefly stated, the arrangement of Fig. 9 comprises a gear box 86 connected to the drive shaft 11 and having extending therefrom a shaft 87 provided with a gear 88 in engagement with a gear 89. The gear 89 is connected by the shaft 91 to the cam 92 having a lobe thereon for closing the contacts 93 at predetermined numbers of revolutions of the shaft 11. There is also provided a clutch 94 connected by way of the shaft 95 to any of the indicators of Figs. 6, 7 and 8 in such a manner that the clutch 94 moves in accordance with the degree of movement of the connected indicator. The clutch is held in engagement by a spring 96 whereby the shaft 97 moves integrally with the shaft 95 except when the clutch is operated by the clutch magnet CM which occurs upon closure of the contacts 93. The shaft 97 is connected with a pointer 98 adapted to engage the contacts 99 and 101. When this occurs a circuit is closed from ground at contact spring 100, shaft 97, pointer 98, contact 99 or 101, as the case may be, conductor 102, alarm device 103 and thence to battery thereby causing the alarm device to operate and give the alarm. The pointer 98 is provided with an arm 104 to which is attached a retractile spring 105 for restoring the pointer 98 to a position intermediate the contacts 99 and 101 whenever the clutch 94 is operated by clutch magnet CM. In operation, if the pointer 98 should move either to the right or left sufficiently to engage either of the contacts 99 or 101 before the contacts 93 are operated by the cam 92 to energize the clutch magnet and release the clutch, the alarm would be given as an indication that this relatively rapid movement of the shaft 95 is the result of a deflated or overinflated condition of one or more of the tires of the vehicle. The stop pins 106 are provided to prevent excessive movement of the pointer 98 and maintain the alarm in operation until the same is restored either by the closure of the contacts 93 or the operation of the switch 107.

Fig. 10 shows in diagrammatic form a circuit arrangement for comparing the speeds of rotation of the wheels of a vehicle with one another and with the drive shaft of the vehicle whereby the relative degree of inflation of each of the tires of the vehicle is registered on a device preferably, though not necessarily, within the view of the operator of the vehicle. The indicating devices designated DS, LF, LR, RF, and RR are electrothermostat indicators arranged to take settings in accordance with the degree of heat applied to a bimetallic thermal element therein.

Fig. 11 illustrates one form of thermal device suitable for use with the arrangement of Fig. 10. Referring specifically to Fig. 11 a bimetallic element 108 is secured by the screws 109 to an insulating support 111 affixed to a base 112, and is provided with a series of scale divisions 113 for indicating the degree of movement of the indicating element. As illustrated, the bimetallic thermal element 108 is provided with a conductor 114 affixed thereto and connected to a terminal 115. A terminal 116 is also provided in electrical circuit with the thermal element 108, the terminals 115 and 116 being connected to the secondary winding S of the transformer T by the conductors 117. The transformer T is of the well-known step-down type wherein the ratio of turns of the primary and secondary windings is such that a relatively high current is induced in the secondary winding S for each impulse applied to the primary winding P which current flows through the thermal element 108 thereby causing the thermal element to be heated with a high degree of efficiency. The terminals of the winding P are connected to the circuit of Fig. 10 in the manner of each of the indicators DS, LF, LR, RF and RR.

In operation the currents resulting from the successive charge and discharge of the condensers 126 of Fig. 10 flow through the windings P of the transformers T thereby inducing relatively high currents in the windings S thereof which flow through the thermal element of each of the indicating devices causing the same to be heated and moved to different positions with respect to the scale divisions 113 in accordance with the degree of rapidity of the impulses received from the associated contact mechanisms.

Fig. 12 shows an arrangement whereby a heating coil 118 causes the bimetallic element to assume different positions in accordance with the degree of current flowing through the coil. The heater coil is connected to the secondary winding of the transformer T or, if desired, the transformer may be omitted and the heater connected directly to the circuit of Fig. 10. While the types of electro-thermostats illustrated on Figs. 11 and 12 of the drawings are representative of simple forms of electro-thermal devices of this character, it will be understood that other specific forms of electro-thermostats may be employed with the invention as, for example, electrothermostats wherein the bimetal element is wound helically or spirally and wherein the current flows through the element or is applied to the element by a heater unit responsive to electric currents and disposed within the helix or spiral.

Fig. 13 illustrates the mechanism for operating the contacts of Fig. 10, the magnet 119 thereof being mounted in such a manner as to be rotated by the wheel of the vehicle and attract the armature 121 thereby moving contact 122 away from contact 123 and into engagement with contact 124 as illustrated on the drawings. When the permanent magnet 119 has moved away from the armature 121, contact 122 is disengaged from contact 124 and engages contact 123. One of the contact mechanisms of Fig. 13 is provided for each wheel of the vehicle and for the drive shaft, the drive shaft contacts being operated through suitable gearing whereby the number of cycles of operation of the drive shaft contacts DS for a given period of time is the same as the wheel contacts LF, LR, RF and RR when the vehicle is in motion with all of the tires thereof properly inflated.

The operation of the circuit of Fig. 10 will now be described. When contact 122 of the drive shaft contact device moves into engagement with contact 123, a circuit is closed from positive battery by way of conductor 125, thermal element DS, condenser 126, contacts 122 and 123, and conductor 127 to negative battery, thereby charging the condenser 126 to the battery potential. Since this circuit included the thermal unit DS an increment of heat was caused to be applied to the bimetal element thereof by the flow of the electric current. As the magnet 119 moved into operative relation with armature 121, contact 122 was disengaged from contact 123 and brought into engagement with contact 124, and a circuit including contacts 122, 124, conductor 128 and the thermal unit DS was completed from one plate of the condenser 126 to the opposite plate of the condenser thereby short-circuiting the condenser and discharging the same, the discharge current flowing through the thermal unit DS and additionally heating the unit. The charge and discharge currents referred to herein persist for only the very brief period of time required to charge and discharge the condenser 126, a fractional part of a second, and the arrangement of Fig. 10, therefore, provides a circuit wherein the degree of heat transferred to the bimetal element is proportional to the rapidity of operations of the contact mechanism which, in turn, is proportional to the speed of rotation of the drive shaft. The register DS takes settings in accordance with the degree of heat applied thereto and, therefore, indicates the speed of rotation of the drive shaft DS. In a similar manner, the registers LF, LR, RF and RR indicate the speeds of rotation of the left front, left rear, right front and right rear tires of the vehicle, respectively.

In the event that the speed of one or more of these tires should be increased due to a decrease in the pneumatic pressure of the tire, the associated bithermal element will receive a corresponding increase in the number of heat increments applied to it during a period of time and take a setting in accordance with the degree of deflation of the tire. If, on the other hand, one or more of the tires should be over-inflated, the associated indicator would receive less heat units in a given period of time and would therefore take a setting to register this condition. The arrangement of Fig. 10 also provides for a comparison with the speeds of each of the wheels with the drive shaft of the vehicle. One of the advantages of the arrangement of Fig. 10 is found in the slow acting nature of the instrumentality employed for speed indication. This characteristic enables the operator to take readings from the indicating devices while the vehicle is at rest as this may be accomplished before the thermal elements have returned to atmospheric temperature condition.

While the invention has been described with reference to certain preferred embodiments thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a vehicle having a plurality of wheels with pneumatic tires thereon for engaging the roadbed over which the vehicle is traveling, means including a plurality of rotatable shafts for indicating the degree of inflation of said pneumatic tires while traveling on said roadbed, a main drive shaft for said vehicle, means including differential gear structure mechanically connected to said plurality of wheels and the drive shaft and operable in accordance with the relative speeds of rotation of said wheels and the drive shaft for causing the indicating means to give a signal when the instant degree of inflation of one of said tires has decreased with respect to the degree of inflation of another of said tires.

2. In a vehicle having a main drive shaft and a plurality of wheels equipped with tires in engagement with the roadbed over which the vehicle is traveling, means for comparing the speed of rotation of one of said wheels with respect to the speed of rotation of another of said wheels of said plurality of wheels of said vehicle during the travel of the vehicle over said roadbed, said comparing means including means invariably operated in accordance with the instant speed of said main drive shaft and means invariably operated in accordance with the speeds of rotation of said wheels, and means operated by said comparing means for indicating the relative speeds of rotation of said wheels.

3. In a vehicle having a main drive shaft and a plurality of wheels equipped with pneumatic tires in engagement with the roadbed over which the vehicle is traveling, means for comparing the pneumatic pressure in one of said tires with another of said tires of said wheels during the travel of said vehicle over said roadbed, said comparing means including means invariably operated in accordance with the instant speed of said main drive shaft and means invariably operated in accordance with the speeds of rotation of said wheels, and means controlled by said comparing means for indicating when the pneumatic pressure in said one of the tires differs by a predetermined amount from the pneumatic pressure in said another of the tires.

4. In a vehicle having a main drive shaft and a plurality of wheels equipped with pneumatic tires in engagement with the roadbed over which the vehicle is traveling, means for comparing the effective diameter of one of said tires with another of said tires of said plurality of wheels of the vehicle during the travel of said vehicle over said roadbed, said comparing means including means invariably operated in accordance with the instant speed of said main drive shaft and means invariably operated in accordance with the speeds of rotation of said wheels, and means controlled by said comparing means for indicating when the effective diameter of said one of the tires differs by a predetermined amount from the effective diameter of said another of the tires.

5. In a vehicle having a plurality of wheels equipped with pneumatic tires in engagement with the roadbed over which the vehicle is traveling, a main drive shaft for said vehicle, means for indicating the degree of inflation of one of said tires with respect to the others of said tires of said wheels during the travel of said vehicle over the roadbed, and means including differential gears mechanically connected to the wheels of the vehicle and the drive shaft for operating said indicating means.

6. In a vehicle having a plurality of wheels equipped with pneumatic tires in engagement with the roadbed over which the vehicle is traveling, means including differential gear structure having a plurality of shafts mechanically connected to said wheels and operable in accordance with the speeds of rotation of said wheels for indicating at all times the instant degree of inflation of one of said tires with respect to the others of said tires of said plurality of wheels of the vehicle during the travel of said vehicle over said roadbed, and means mechanically connected to said wheels and said differential gear structure and settable at will for compensating for the difference in the speeds of rotation of said wheels caused by decrease in the effective diameter of certain of said tires due to the wear of said tires.

7. In a vehicle having a main drive shaft and a plurality of wheels equipped with pneumatic tires in engagement with the roadbed over which the vehicle is traveling, means invariably operable in accordance with the instant speed of said main drive shaft and the speeds of rotation of said wheels for indicating when the pneumatic pressure in one of said tires has varied from a predetermined value, said indicating means comprising means for automatically comparing at all times the instant pressure in each of said tires with the pressure in the others of said tires while said vehicle is in motion.

8. In a vehicle having a main drive shaft and a plurality of wheels with pneumatic tires thereon in engagement with the roadbed over which the vehicle is traveling, a plurality of rotatable shafts connected to said wheels and the drive shaft and operable in accordance with the angular speeds of said wheels and the instant speed of the drive shaft, means including a differential mechanism controlled by said rotatable shafts, and a tire indicator mounted on said vehicle and having means for continuously indicating the instant condition of said tires controlled by said differential mechanism while the vehicle is traveling over said roadbed.

9. A vehicle having wheels with pneumatic tires thereon in engagement with the roadbed over which the vehicle is traveling, a plurality of rotatable shafts mechanically connected to the wheels of the vehicle and operated in accordance with the angular speeds of said wheels, means mechanically connected to at least one of said shafts and settable at will for compensating for the degree of wear of at least one of said tires with respect to others of the tires, a differential mechanism controlled by said shafts and said compensating means, and a tire indicating device mounted on said vehicle and controlled by said differential mechanism, said device having means for indicating at all times the instant degrees of pressures of said tires while the vehicle is traveling over the roadbed.

10. A vehicle having a plurality of wheels with pneumatic tires thereon in engagement with the roadbed over which the vehicle is traveling, a drive shaft for said vehicle, tire indicating means mounted on said vehicle comprising a rotatable stroboscopic element, means for operating said stroboscopic element in accordance with the angular speed of said drive shaft, means operatively connected to said wheels for generating electrical impulses in accordance with the angular speeds of the wheels, a source of light for illuminating said stroboscopic element, and means controlled by said electrical impulses for momentarily operating the source of light in accordance with the speeds of said wheels whereby the degree of inflation of the tires of said vehicle is registered at all times by the tire indicating means while the vehicle is traveling over the roadbed.

11. A vehicle having a main drive shaft and a plurality of wheels with pneumatic tires thereon for engaging the roadbed over which the vehicle is traveling, differential means operatively connected to said plurality of wheels and to the main drive shaft, a tire indicator mounted on said vehicle and operated by said differential means, said tire indicator having means for continuously registering the instant degree of inflation of said tires while the vehicle is traveling in a straight line along said roadbed, and means intermediate said differential means and the registering means for automatically compensating for the difference in the speeds of the wheels while the vehicle is traveling in a curve along the roadbed.

CLARENCE G. STONE.
HENRY F. HERBIG.